US012665251B2

(12) United States Patent
Kim

(10) Patent No.: US 12,665,251 B2
(45) Date of Patent: Jun. 23, 2026

(54) BATTERY MODULE

(71) Applicant: Samsung SDI Co., Ltd., Yongin-si (KR)

(72) Inventor: Young Deok Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 650 days.

(21) Appl. No.: 18/147,590

(22) Filed: Dec. 28, 2022

(65) Prior Publication Data

US 2023/0216125 A1 Jul. 6, 2023

(30) Foreign Application Priority Data

Dec. 30, 2021 (KR) ........................ 10-2021-0192761

(51) Int. Cl.
| | |
|---|---|
| *H01M 50/242* | (2021.01) |
| *H01M 10/48* | (2006.01) |
| *H01M 50/204* | (2021.01) |
| *H01M 50/209* | (2021.01) |
| *H01M 50/211* | (2021.01) |

(52) U.S. Cl.
CPC ....... *H01M 50/242* (2021.01); *H01M 10/482* (2013.01); *H01M 50/204* (2021.01); *H01M 50/209* (2021.01); *H01M 50/211* (2021.01)

(58) Field of Classification Search
None
See application file for complete search history.

(56) References Cited

U.S. PATENT DOCUMENTS

| | | | |
|---|---|---|---|
| 6,225,778 B1 | 5/2001 | Hayama et al. |
| 9,660,230 B2 | 5/2017 | Noh |
| 9,716,256 B2 | 7/2017 | Noh et al. |
| 9,985,257 B2 | 5/2018 | Kim et al. |

(Continued)

FOREIGN PATENT DOCUMENTS

| | | |
|---|---|---|
| CN | 104466049 A | 3/2015 |
| CN | 206849895 U | 1/2018 |

(Continued)

OTHER PUBLICATIONS

Chinese Office Action issued in corresponding Patent Application No. CN 202211707592.1, dated Jan. 7, 2026, 9 pages.

(Continued)

*Primary Examiner* — Gregg Cantelmo

(74) *Attorney, Agent, or Firm* — Womble Bond Dickinson (US) LLP

(57) ABSTRACT

A battery module including: a battery cell having opposite top and bottom surfaces, a long side surface extending between the top surface and the bottom surface, and a short side surface extending between the top surface, the bottom surface, and the long side surface, the battery cell including a terminal on the top surface; an end plate having an end area in contact with the long side surface of the battery cell and an end flange bent from a lower end of the end area in a direction away from the long side surface; and a side plate having a side area in contact with the short side surface of the battery cell, a side flange bent from a lower end of the side area to cover the bottom surface of the battery cell, and a side binder extending from the side flange and coupled to the end flange.

12 Claims, 6 Drawing Sheets

(56) References Cited

U.S. PATENT DOCUMENTS

| | | | |
|---|---|---|---|
| 2014/0030566 A1* | 1/2014 | Lee ..................... | H01M 50/209 |
| | | | 429/90 |
| 2014/0356664 A1* | 12/2014 | Jung .................. | H01M 50/291 |
| | | | 429/82 |
| 2015/0024253 A1 | 1/2015 | Noh | |
| 2015/0064542 A1* | 3/2015 | Noh .................... | H01M 50/291 |
| | | | 429/156 |
| 2015/0079451 A1 | 3/2015 | Jeong et al. | |
| 2015/0140406 A1* | 5/2015 | Kim ................... | H01M 50/224 |
| | | | 429/156 |
| 2017/0141365 A1 | 5/2017 | Kim et al. | |
| 2021/0013469 A1* | 1/2021 | Naito ................. | H01M 50/249 |

FOREIGN PATENT DOCUMENTS

| | | |
|---|---|---|
| DE | 10 2014 214 002 A1 | 4/2016 |
| EP | 3 496 182 A1 | 6/2019 |
| EP | 3 506 387 A1 | 7/2019 |
| KR | 10-2001-0015359 A1 | 2/2001 |
| KR | 10-2015-0026609 A1 | 3/2015 |
| KR | 10-2015-0142790 A | 12/2015 |
| KR | 10-2017-0056976 A | 5/2017 |
| KR | 10-1794265 B1 | 11/2017 |

OTHER PUBLICATIONS

Korean Office Action corresponding to KR Application No. 10-2021-0192761, dated Apr. 24, 2026 (6 pages).

* cited by examiner

BATTERY MODULE

CROSS-REFERENCE TO RELATED APPLICATION

This application claims priority to and the benefit of Korean Patent Application No. 10-2021-0192761, filed on Dec. 30, 2021, in the Korean Intellectual Property Office, the entire content of which is herein incorporated by reference

BACKGROUND

1. Field

Aspects of embodiments of the present disclosure relate to a battery module.

2. Description of the Related Art

Electric vehicles include tens to thousands of battery cells. Generally, a plurality of cells is bundled together and accommodated in a frame to be protected from an external forces, such as heat and vibration. The bundle of the cells is referred to as a battery module. In addition, a battery management system and a cooling device, which manages temperature and voltage, are added to the plurality of modules, which is then referred to as a battery pack.

The above-described information disclosed is some of the technology that serves as the background of the present disclosure but is for improving understanding of the background of the present disclosure. Thus, it may include information that does not constitute the related art.

SUMMARY

Embodiments of the present disclosure provide a battery module in which a lower area of an end plate and a lower area of a side plate are coupled to each other to reduce or minimize swelling of a lower portion of the cells when the battery pack is in an end-of-life (EOL) period, thereby preventing the lower portion of the cells from being damaged and to improve ease of assembly between a module and a pack interface when replacing or repairing the end-of-life (EOL) module in a vehicle.

Embodiments of the present disclosure also provide a battery module in which cells are not damaged or partially deteriorated even when relatively high swelling forces are applied to the module during an EOL period.

According to an embodiment of the present disclosure, a battery module includes: a battery cell having a top surface, a bottom surface opposite to the top surface, a long side surface extending between the top surface and the bottom surface, and a short side surface extending between the top surface, the bottom surface, and the long side surface, the battery cell including a terminal on the top surface; an end plate having an end area in contact with the long side surface of the battery cell and an end flange bent from a lower end of the end area in a direction away from the long side surface; and a side plate having a side area in contact with the short side surface of the battery cell, a side flange bent from a lower end of the side area to cover the bottom surface of the battery cell, and a side binder extending from the side flange and coupled to the end flange.

The side binder may include: an extension part gradually expanded to extend from the side flange; a bent part bent from the extension part in an upward direction away from the long side surface; and a coupling part extending from the bent part and coupled to the end flange.

The coupling part of the side binder and the end flange of the end plate may be welded to each other.

The end flange of the end plate and the side binder of the side plate may be spaced apart from a corner part at where the long side surface, the short side surface, and the bottom surface of the battery cell contact each other.

The side binder may extend in an S shape or a Z shape from the side flange.

An area of the bottom surface of the battery cell covered by the side binder may be greater than an area of the bottom surface of the battery cell covered by the side flange.

The battery module may further include: a first auxiliary end plate between the long side surface of the battery cell and the end plate; and a bushing mount on the long side surface of the battery cell and to which the end plate and the side plate are coupled.

The first auxiliary end plate may have a concave groove, and the end plate may include a protrusion coupled to the concave groove.

The first auxiliary end plate may include: a body in contact with the long side surface of the battery cell and the end plate; and a swelling absorption part extending from the body, in contact with the long side surface of the battery cell, and spaced apart from the end plate.

The swelling absorption part may have a thickness that is less than that of the body.

The end plate may include stainless steel, and the first auxiliary end plate may include aluminum.

The battery module may further include a pack mounting member coupled to a bottom surface of the bushing mount, and the bottom surface of the bushing mount may be at a position higher than the end flange and the side binder.

The battery module may further include: a second auxiliary end plate coupled to the bushing mount; and an insulating plate coupled to the second auxiliary end plate.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and, together with the description, explain aspects and features of the present disclosure. In the drawings.

DETAILED DESCRIPTION

Figure 1A:
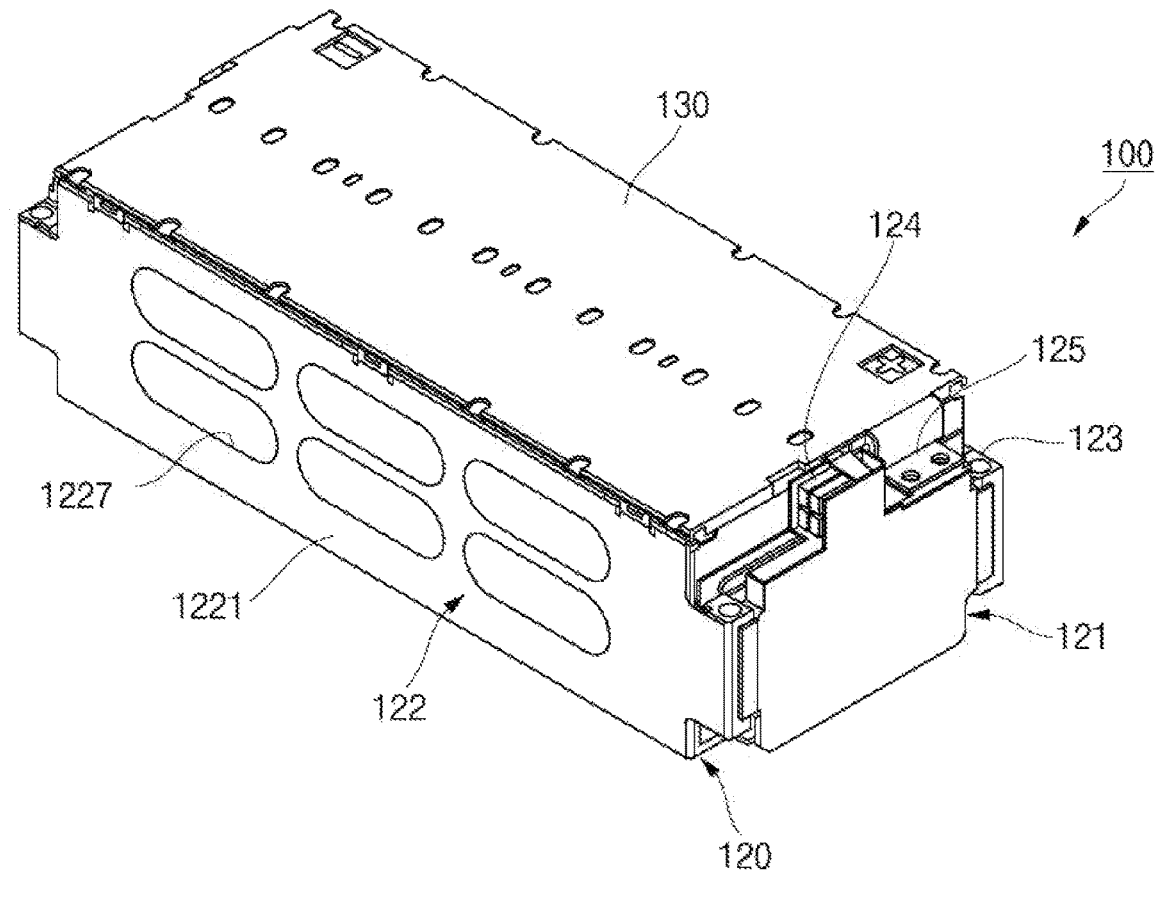
FIGS. 1A to 1C are perspective, side, and bottom views, respectively, of a battery module according to an embodiment.

Hereinafter, embodiments of the present disclosure will be described, in detail, with reference to the accompanying drawings.

The present disclosures may, however, be embodied in many different forms and should not be construed as being limited to the embodiments set forth herein; rather, these embodiments are provided so that this disclosure will be thorough and complete and will fully convey the scope of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. Hereinafter, the expression "contact" is a concept including "indirect contact" as well as "direct contact".

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 1B:
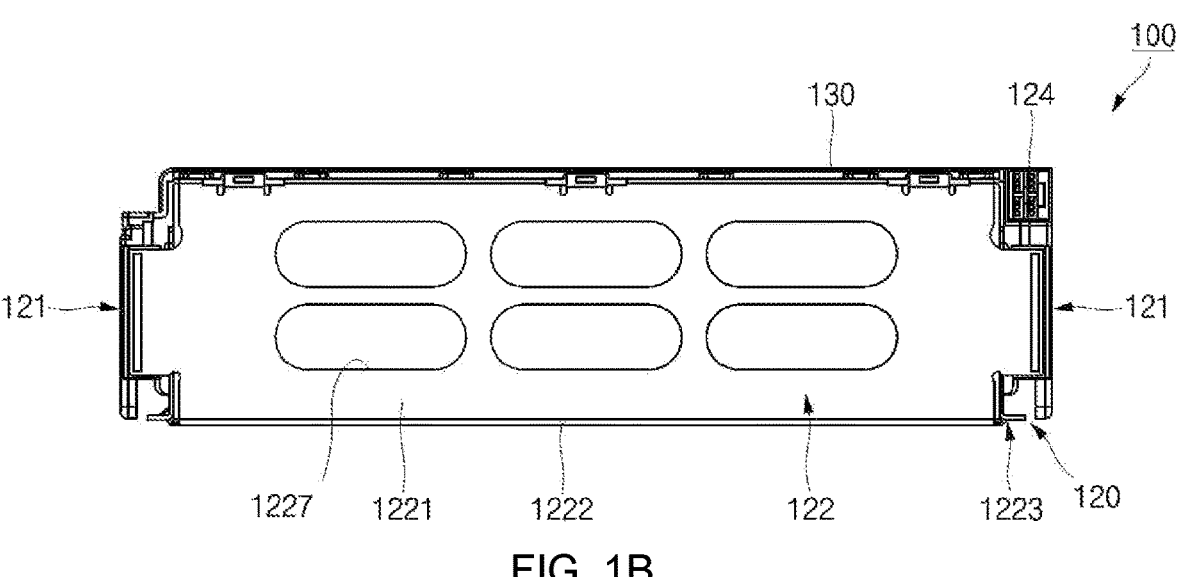
Figures 1C, 2A:
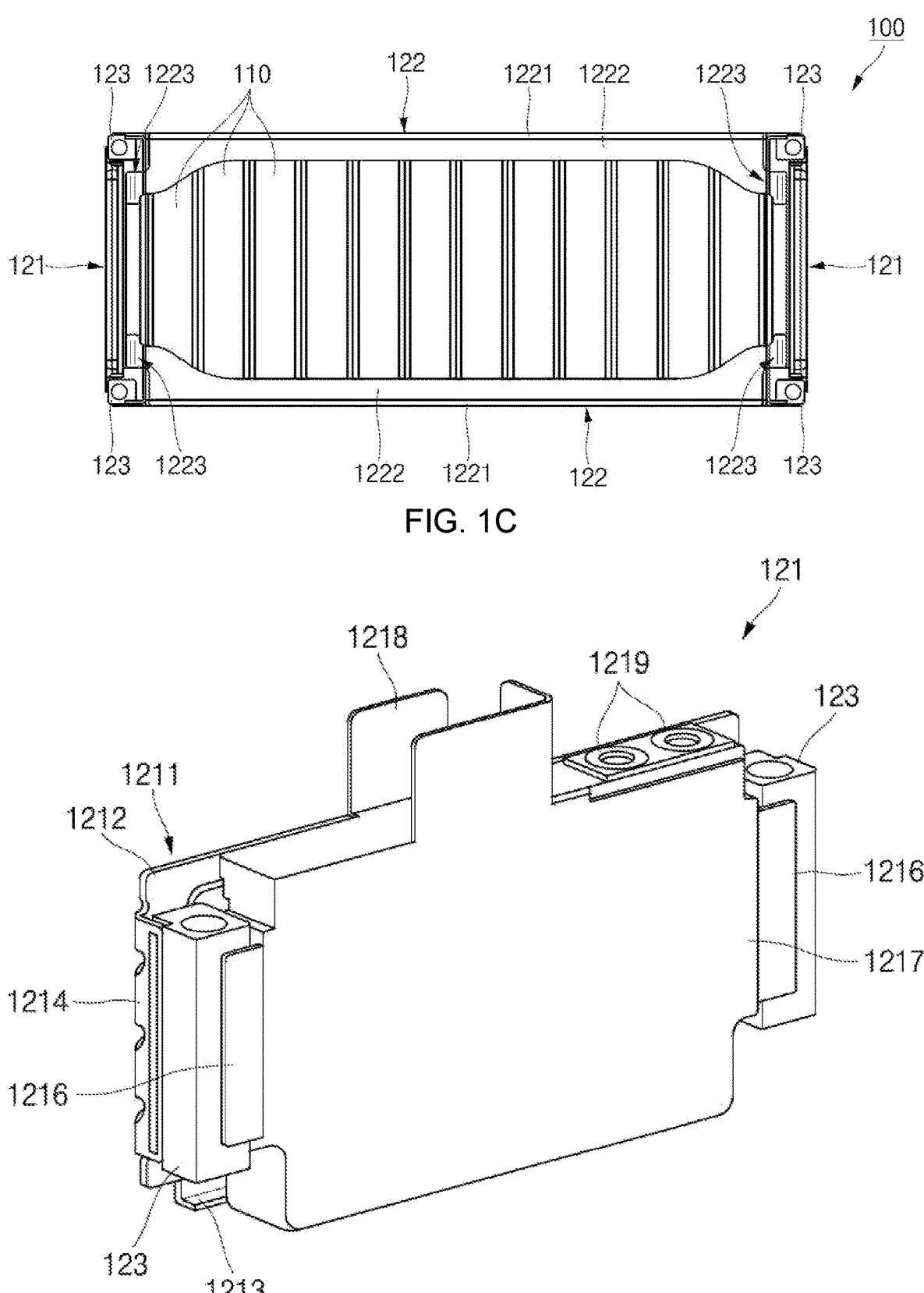
FIGS. 2A and 2B are front perspective and rear perspective views, respectively, of an end plate member in the battery module shown in FIGS. 1A to 1C.

FIGS. 1A to 1C are perspective, side, and bottom views, respectively, of a battery module 100 according to an embodiment. In the embodiment illustrated in FIGS. 1A, 1B, and 1C, the battery module 100 may include a plurality of battery cells 110 and a module frame 120. In some embodiments, the battery module 100 may further include a module cover 130 covering the plurality of battery cells 110 and the module frame 120.

In some embodiments, the plurality of battery cells 110 may be arranged in a row. The battery cell 110 (e.g., some or each of the battery cells 110) may have a top surface at where terminals are provided, a bottom surface opposite to the top surface, a long side surface connecting (e.g., extending between) the top surface and the bottom surface, and a short side surface connecting (e.g., extending between) the top surface, the bottom surface, and the long side surface. In some embodiments, an area (e.g., a surface area) of the long side surface may be relatively greater than that of the short side surface, and the long side surfaces of the battery cells 110 may be arranged in a line to face each other (e.g., may be arranged in parallel with each other). In some embodiments, the battery cell 110 may be a prismatic battery in which an electrode assembly is accommodated in a can or case or a pouch-type battery in which an electrode assembly is accommodated in a pouch.

The plurality of battery cells 110 may be connected to each other in series and/or parallel by one or more bus bars to complete the battery module 100, and a plurality of the battery modules 100 may be prepared to constitute a battery pack. In some embodiments, the bus bar may be electrically connected to the terminal provided in the battery cell 110, and the terminal and the bus bar may be covered and protected by the module cover 130, described above. In some embodiments, the battery pack may be electrically connected to an electric vehicle or charger. In some embodiments, a cooling device may be further provided on the bottom surface of the battery module 100 to maintain the battery module 100 within a safe temperature range during use.

The module frame 120 may include a pair of end plate members 121 and a pair of side plates 122.

The pair of end plate members 121 may be provided to be in contact with the long side surface of a first battery cell 110 and the long side surface of a last battery cell 110 from among the battery cells 110 that are arranged in a row. In some embodiments, each of the end plate members 121 may have a module mounting interface configured to connect to a pack through a bushing mount (e.g., a mounting bush) 123 and may also include a low voltage connector 124 and a high voltage terminal interface 125.

The pair of side plates 122 may be provided to be in contact with the short side surface of the battery cells 110 that are arranged in a row. The side plate 122 may be connected to the end plates member 121 at both ends (e.g., opposite ends) of the battery module 100, and thus, rigidity of the module frame 120 may be maintained and the side surface of the battery module 100 may be protected.

The side plate 122 may have a side area 1221 and a side flange 1222. The side plate 122 may also include a side binder 1223 that couples the side flange 1222 to the end plate member 121. In some embodiments, the side area 1221 may have a plurality of through holes 1227 for weight reduction.

As described above, the module frame 120 may be provided to restrict a circumference of the battery cells 110 that are arranged in a line. Accordingly, even if the battery cells 110 swell due to a chemical reaction caused by charging and/or discharging, the battery module 100 may not interfere with various pack interfaces. Further, the module frame 120 may protect the battery cells 110 from being damaged when a vibration, an impact, crush, or a nail penetration phenomenon occurs. The module frame 120 may include or may be referred to as a rigid body, retainer, housing, case, and the like.

Figure 2B:
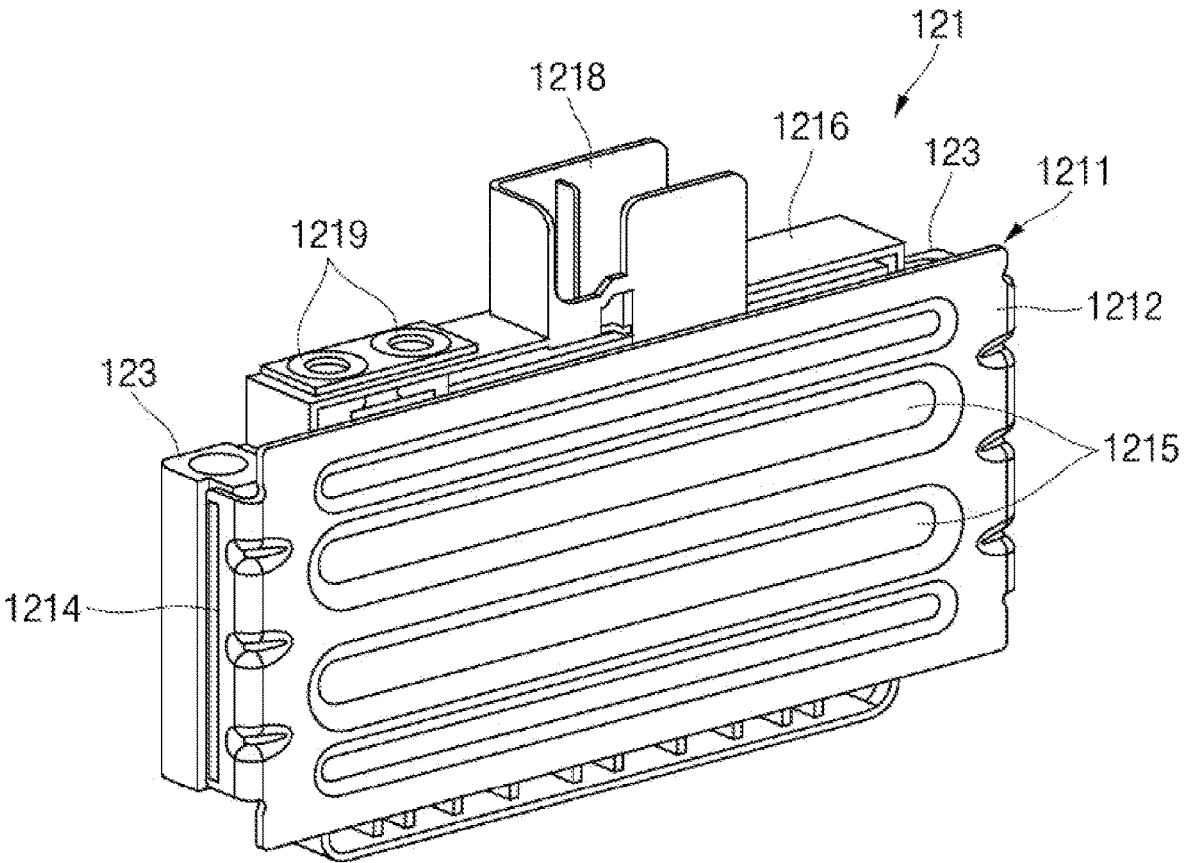

FIGS. 2A and 2B are front perspective and rear perspective views, respectively, of the end plate member 121 in the battery module 100 according to an embodiment. In the embodiment illustrated in FIGS. 2A and 2B, the end plate member 121 includes an end plate 1211 and a bushing mount 123. In some embodiments, the end plate member 121 may further include an auxiliary end plate 1216 and/or an insulating plate 1217.

The end plate 1211 may have an end area (e.g., an edge) 1212, a lower end flange 1213, and a side end flange 1214. The end area 1212 may have a substantially flat plate shape and may be in contact with the long side surface of the one battery cell 110. In some embodiments, the end area 1212 may include a plurality of horizontal recess parts 1215 recessed in a direction away from the long side surface of the one battery cell 110 (e.g., may have a corrugated surface) to improve its rigidity. The lower end flange 1213 may be bent in a direction away from the long side of the one battery cell 110 from a lower end of the end area 1212. A horizontal width of the lower end flange 1213 may be less than a horizontal width of the end area 1212, and a height width (or vertical width) of the side end flange 1214 may be less than a height width (or vertical width) of the end area 1212.

The lower end flange 1213 may be bent to be approximately perpendicular to the end area 1212. The side end flange 1214 may be bent from each of both ends (e.g., opposite ends) of the end area 1212 in a direction away from the long side surface of the battery cell 110. The side end flange 1214 may also be bent to be approximately perpendicular to the end area 1212. In some embodiments, the side end flange 1214 may be coupled (e.g., laser welded) to the bushing mount 123. The end plate 1211 may include (or may be formed of) stainless steel or aluminum.

In some embodiments, the bushing mount 123 may be provided standing in a vertical direction on each of both sides of the front side of the end plate 1211 and may be coupled to the side end flange 1214 as described above. A height (or length) of the bushing mount 123 may be less than a height (or length) of the end plate 1211. In some embodiments, the bushing mount 123 may be a hollow column. In some examples, a bottom surface of the bushing mount 123 may have a height greater than that of the lower end flange 1213, and a pack mounting member 140 (see, e.g., FIG. 4) may be coupled to the bottom surface of the bushing mount 123. In some examples, the bushing mount 123 may include stainless steel or aluminum.

In some examples, the auxiliary end plate 1216 may be coupled (e.g., laser welded) to the bushing mount 123, and the insulating plate 1217 may be coupled to the auxiliary end plate 1216. The auxiliary end plate 1216 and the insulating plate 1217 may be provided by (e.g., may be formed by) a double injection method. The insulating plate 1217 may provide module interfaces 1218 and 1219 to allow the low voltage connector 124 and the high voltage terminal interface 125, etc. to be coupled thereto. In some examples, the low voltage connector 124 can be coupled on (or to) the module interface 1218 and the high voltage terminal interface 125 can be coupled on (or to) the module interface 1219.

Figure 3A:
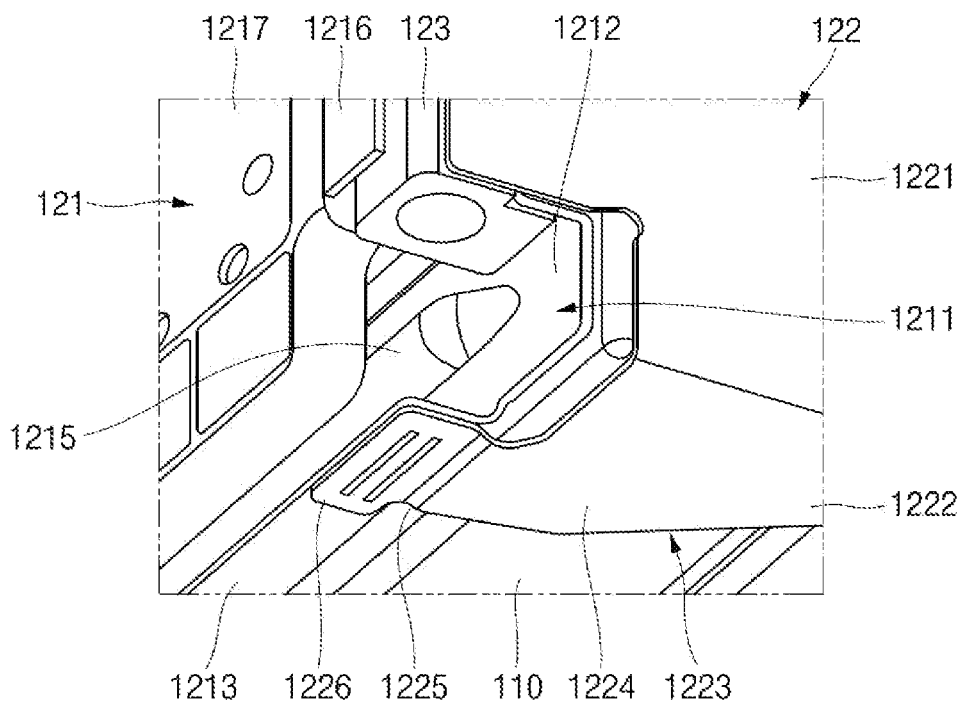
FIGS. 3A to 3C are perspective, bottom, and side views, respectively, of a coupling structure between a side plate and the end plate in the battery module shown in FIGS. 1A to 2B.
Figure 3B:
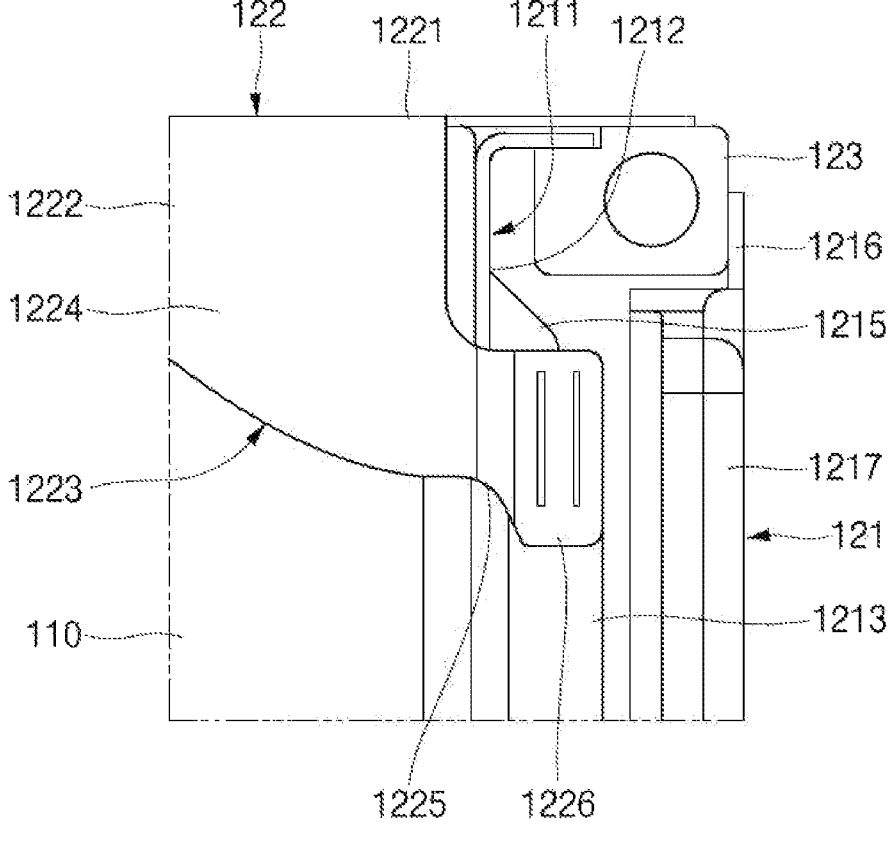
Figure 3C:
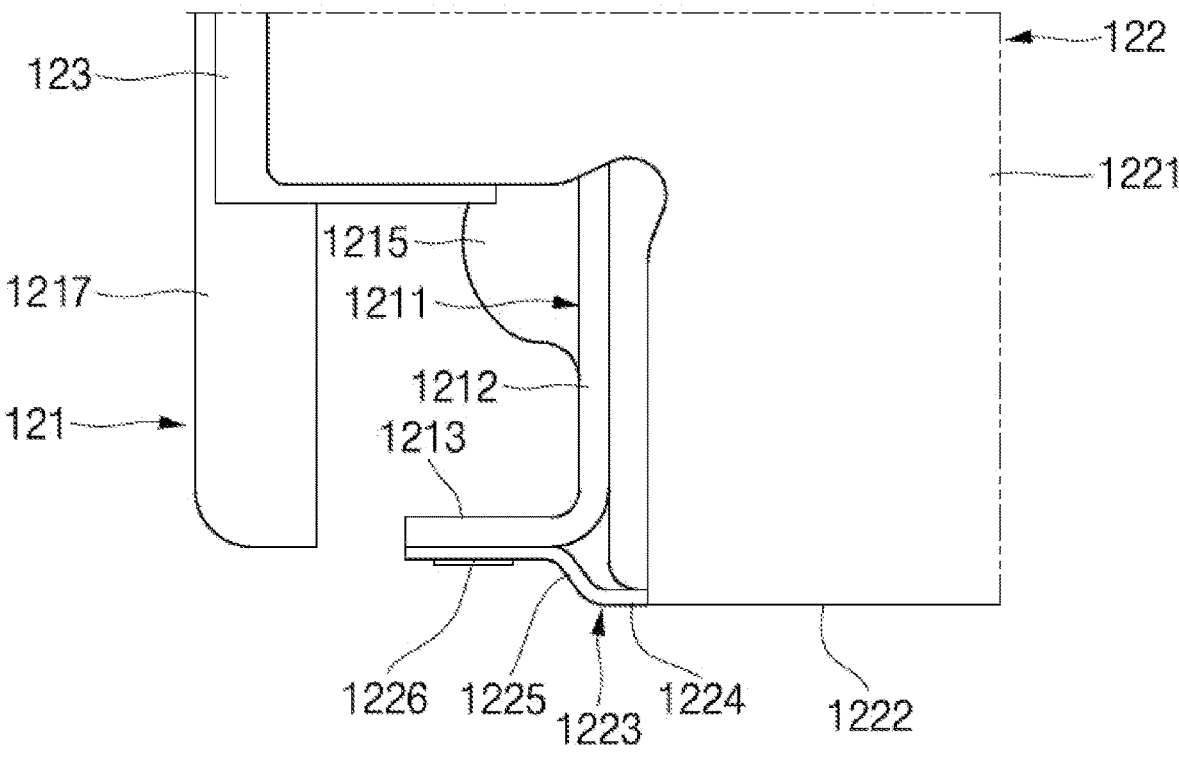

FIGS. 3A to 3C are perspective, bottom, and side views, respectively, of a coupling structure between the side plate 122 and the end plate 1211 in the battery module 100 according to an embodiment. Hereinafter, reference is made to the above-described FIGS. 1A to 1C, FIGS. 2A and 2B together with FIGS. 3A to 3C.

In the embodiment illustrated in FIGS. 1A to 1C, 2A to 2B, and 3A to 3C, the side plate 122 has a side area 1221, a side flange 1222, and a side binder 1223.

In some embodiments, the side area 1221 may have a substantially flat plate shape and may be provided to be in contact with the short side surface of the battery cells 110. The side flange 1222 may be provided to be bent from a lower end of the side area 1221 so as to cover a portion of the bottom surface of the battery cell 110. In some examples, the side flange 1222 may be bent in a direction that is approximately perpendicular to side area 1221. In some examples, a ratio of the bottom surface of the battery cell 110 covered by the side flange 1222 may range of about 1% to about 20% (where the entire bottom surface of the battery cell 110 is 100%). In some examples, the side plate 122 may include stainless steel or aluminum.

In some examples, the side binder 1223 may extend from the side flange 1222 and may be coupled to the lower end flange 1213. The side binder 1223 may extend from the side flange 1222 corresponding to the first battery cell 110 or a subsequent battery cell 110. In some embodiments, the side binder 1223 may extend from the side flange 1222 corresponding to the last battery cell 110 or the former battery cell 110.

In some embodiments, the side binder 1223 may have an extension part 1224, a bent part 1225, and a coupling part 1226. The extension part 1224 may be gradually expanded to extend from the side flange 1222. For example, the extension part 1224 may be gradually expanded in area to extend from (e.g., a width of the extension part 1224 may increase from) the side flange 1222. The bent part 1225 may be bent in an upward direction from the extension part 1224 away from the long side surface of the battery cells 110. In some embodiments, the bent part 1225 may be bent upwardly in a direction away from the long side surface of the battery cells 110 at a position spaced apart from the short side surface of the battery cells 110. The coupling part 1226 may extend from the bent part 1225 and may be coupled to the lower end flange 1213. The coupling part 1226 may be mechanically and/or thermally coupled to the lower end flange 1213 by laser welding, resistance welding, ultrasonic welding, or the like. As illustrated in FIGS. 3A and 3B, two laser-welded lines may be observed on (e.g., formed on) the coupling part 1226.

The lower end flange 1213 of the end plate 1211 may also be bent in a direction away from the long side surface of the battery cells 110 at a position spaced apart from the short side surface of the battery cells 110. Also, in some embodiments, a height of the lower end flange 1213, at a position, may be slightly higher than the side flange 1222 of the side plate 122. For example, the height of the lower end flange 1213 may be slightly higher than the extension part 1224 of the side binder 1223. Thus, as the bent part 1225 of the side binder 1223 is bent upwardly, a top surface of the coupling part 1226 may be in contact with the bottom surface of the lower end flange 1213.

The side binder 1223 may extend from the side flange 1222 in an approximate S shape or Z shape when the battery module 100 is viewed from the bottom surface. Therefore, when a swelling force is applied from the battery cell 110, for example, at its EOL period, stress applied to the side binder 1223 coupled to the end plate 1211 may be dispersed to prevent the side binder 1223 from being damaged.

In addition, the side binder 1223 may cover the bottom surface of the battery cell 110 more widely than the side flange 1222. In some embodiments, an area of the bottom surface of the first or last battery cell 110 covered by the side binder 1223 may be larger than that of the bottom surface of each of other battery cells 110 covered by the side flange 1222. In some embodiments, a ratio of the bottom surface of the battery cell 110 covered by the side binder 1223 may be in a range of about 1% to about 40% or, in some embodiments, in a range of about 12% to about 30%. In some embodiments, the end plate 1211 may act as a heatsink, and because the side binder 1223 is mechanically and/or thermally coupled to the end plate 1211, heat dissipation performance of the first and/or last battery cell(s) 110 may be improved. Thus, a temperature deviation between the battery cells 110 may be further reduced. In other words, even when the side binder 1223 relatively widely covers the bottom surface of the first and/or last battery cell 110 (e.g., the bottom surface of the battery cell 110 is cooled by being in contact with the cooling device), the corresponding battery cell 110 may be cooled by (or through) the end plate 1211, and thus, the temperature deviation of all battery cells may be small.

Because the coupling part 1226 of the side binder 1223 is welded to the lower end flange 1213 of the end plate 1211, the rigidity of the end plate 1211 may be improved. In some embodiments, due to the coupling of the side plate 122 and the end plate 1211 through the side binder 1223, an amount of deformation of the battery module 100 may be reduced by about 50% compared to a conventional battery module.

In addition, the side binder 1223 may have a bent part 1225 provided between the extension part 1224 and the coupling part 1226 to absorb (e.g., to accommodate) a component tolerance between the end plate 1211 and the side plate 122. In some embodiments, a two-stage (or two-part) bent structure may be provided to the bent part 1225, and due to the bent structure, the lower end flange 1213 of the end plate 1211 and the coupling part 1226 of the side binder 1223 may be strong contact with each other during the laser welding process, and thus, welding quality may be improved. In some embodiments, an overlap width between the lower end flange 1213 and the coupling part 1226 may be at least about 0.1 mm to about 5 mm. Therefore, because the lower end flange 1213 and the coupling part 1226 are in strong contact with each other and the overlap width is relatively wide, problems including laser welding defects, such as pores, undercuts, cracks, and insufficient welding shear force, may be prevented.

Figure 4:
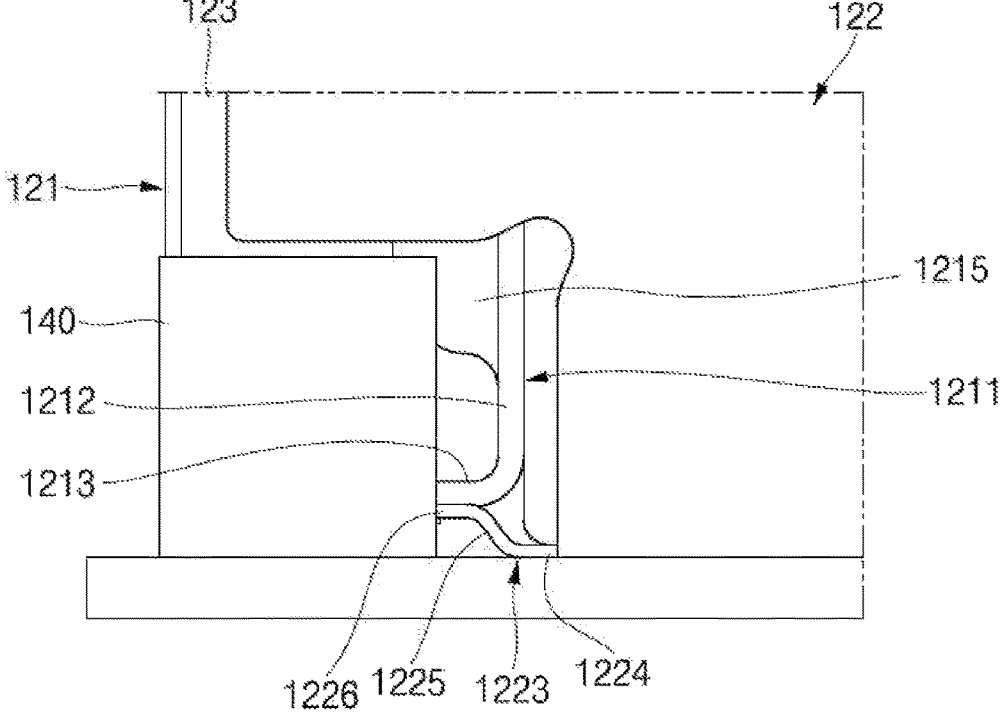
FIG. 4 is a side view showing a relationship between the coupling structure of the side plate and the end plate and a pack mounting structure in the battery module shown in FIGS. 1A to 3C.

FIG. 4 is a side view of a relationship between the coupling structure of the side plate and the end plate and a pack mounting structure in the battery module according to an embodiment. Referring to FIGS. 3A to 3C and FIG. 4 together, a space between the lower end flange 1213 of the end plate 1211, the side binder 1223 of the side plate 122, and the bushing mount 123 may be provided, and the pack mounting member 140 for mounting the battery module 100 may be provided in this space. Thus, the battery module 100 and the pack mounting member 140 may not interfere with each other because of the space. In addition, as described above, the rigidity of the lower portion of the end plate 1211 may be improved due to the mutual coupling structure of the side plate 122 and the end plate 1211 by the side binder 1223, and thus, swelling at a lower portion of the first battery cell 110 and/or the last battery cell 110 adjacent to the end plate 1211 may be suppressed during the EOL period of the battery module 100. For example, swelling of the battery cell 110 adjacent thereto may be suppressed due to the improved rigidity of the lower portion of the end plate 1211. Thus, the battery cell 110 may not interfere with the pack interface, such as the pack mounting member 140, and replacement and/or reassembly of the battery module 100 may be easy. In addition, the swelling of the lower portion of the battery cells 110 may be suppressed, and thus, a phenomenon in which a lower portion of a cell can(s) or cell case(s) is ruptures or is torn, or lifespan decreases due to partial deterioration, may be suppressed.

Figure 5A:
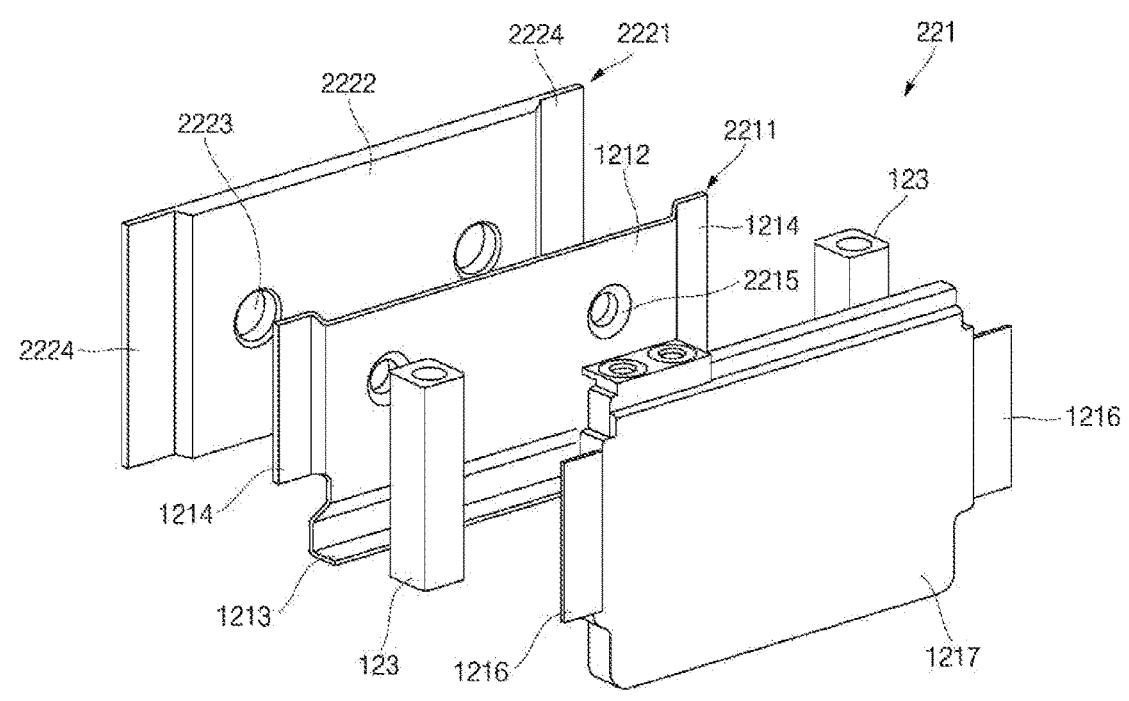
FIGS. 5A and 5B are a front exploded perspective view and a partial transverse cross-sectional view, respectively, of an end plate member in the battery module shown in FIGS. 1A to 4.
Figure 5B:
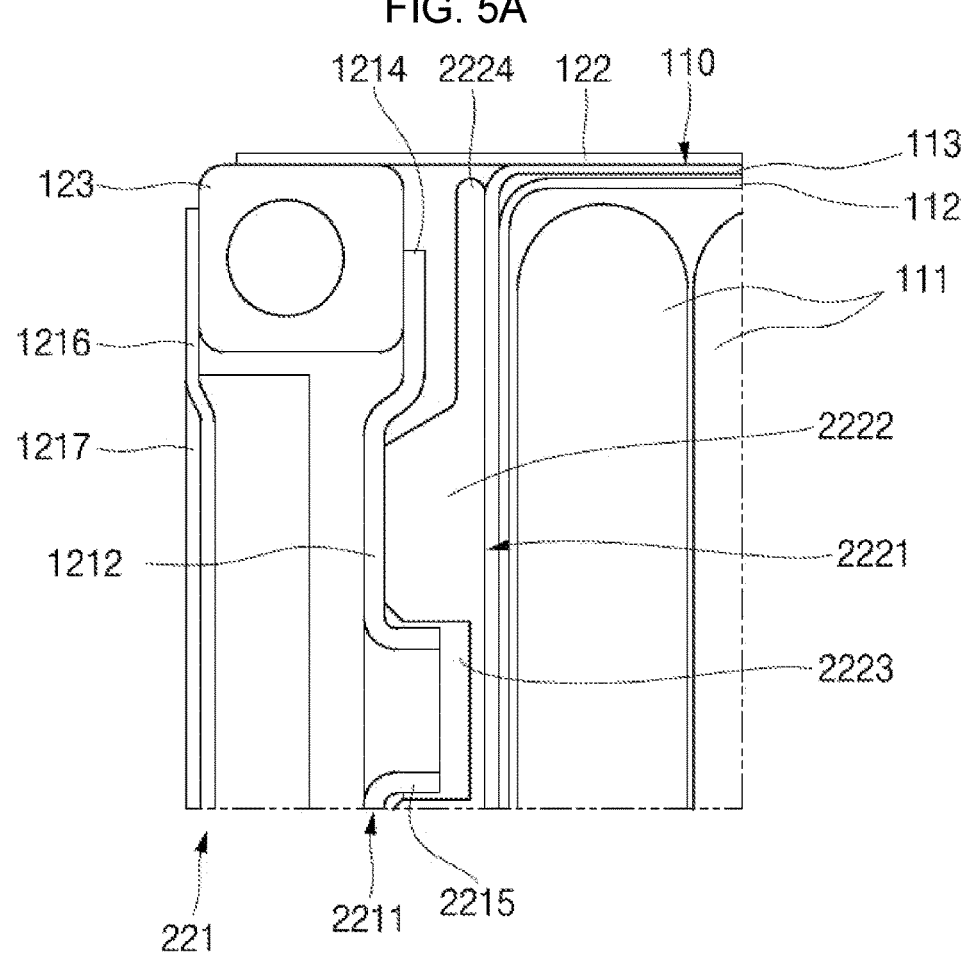

FIGS. 5A and 5B are a front exploded perspective view and a partial transverse cross-sectional view, respectively, of the end plate member 221 in the battery module 100 according to an embodiment. In the embodiment illustrated in FIGS. 5A and 5B, the end plate member 221 may further include an end plate 2211, a first auxiliary end plate 2221, a bushing mount 123, a second auxiliary end plate 1216, and an insulating plate 1217. In some embodiments, the end plate 2211 may be similar to the above-described end plate 1211. In addition, because the coupling structure between the end plate 2211 and the side plate (e.g., the side plate 122) is the same as or similar to that described above, repeat descriptions thereof will be omitted.

The end plate 2211 may have a protrusion 2215 facing the long side surface of the battery cell 110. The protrusion 2215 may include or be referred to as a burr occurring by passing through the end plate 2211. In some embodiments, two protrusions 2215 spaced apart from each other in a horizontal direction may be provided on the end plate 2211.

The first auxiliary end plate 2221 may be interposed between the long side surface of the battery cell 110 and the end plate 2211. In some embodiments, the first auxiliary end plate 2221 may be in contact with the long side surface of the battery cell 110 and the end plate 2211. The first auxiliary end plate 2221 may have a concave groove 2223. In some embodiments, two concave grooves 2223 spaced apart from each other in a horizontal direction to correspond to the protrusions 2215 may be provided in the first auxiliary end plate 2221. In some embodiments, the protrusion 2215 of the end plate 2211 may be coupled to (e.g., may be inserted into) the concave groove 2223 in the first auxiliary end plate 2221.

The first auxiliary end plate 2221 may include a body 2222 and a swelling absorption part 2224. The body 2222 may be in contact with each of the long side surface of the battery cell 110 and the end plate 2211. The swelling absorption part 2224 may extend in the form of a wing in each of both directions from the body 2222 and may be in contact with the long side surface of the battery cell 110 or may be spaced apart from the end plate 2211. In some embodiments, a spaced distance between the swelling absorption part 2224 and the end plate 2211 may be in a range of about 1 mm to about 5 mm. If the spaced distance is less than about 1 mm, a swelling margin is too small such that the swelling absorption part 2224 may be in contact with the end plate 2211 before the EOL period. When the spaced distance is greater than about 5 mm, the battery cell 110 swelling and anti-stress performance are no longer improved. However, the spaced distance or a swelling allowance space are affected by a cell expansion rate, cell rigidity, a cell packing ratio (e.g., a ratio of the electrode assembly occupied within the cell can), stiffness of the end plate, compressive force of the insulating material interposed between the cells, and a gap applied between the cells, and thus, the spaced distance may be determined in consideration of the above-described aspects.

In some embodiments, a thickness of the swelling absorption part 2224 may be less than that of the body 2222. For example, the swelling absorption part 2224 may have a thickness in a range of about 1 mm to about 3 mm, and the thickness of the body 2222 may be in a range of about 6 mm to about 8 mm to ensure rigidity.

In some embodiments, the end plate 2211 may be made of stainless steel, and the auxiliary end plate 2221 may be made of aluminum to reduce the weight of the battery module 100.

The bushing mount 123 may be vertically erected (e.g., vertically oriented or arranged) to be installed on the long side surface of the battery cell 110, and the end plate 2211, the side plate 122, and the second auxiliary end plate 1216 may be coupled (e.g., welded) to the bushing mount 123. The first auxiliary end plate 2221 may be spaced apart from the bushing mount 123 without being coupled to the bushing mount 123. In some embodiments, the end plate 2211 may be coupled to an inner surface of the bushing mount 123 (e.g., in a direction toward the long side surface of the battery cell 110), the second auxiliary end plate 1216 may be coupled to a front outer surface of the bushing mount 123 (e.g., in a direction away from the long side surface of the battery cell 110), and the side plate 122 may be coupled to an outer surface of a side portion of the bushing mount 123.

The second auxiliary end plate 1216 and the insulating plate 1217 may be disposed in front of the end plate 2211 while being coupled to each other. In some embodiments, the second auxiliary end plate 1216 and the insulating plate 1217 may be provided by (e.g., formed by) a double injection method.

The end plate 2211 and the auxiliary end plate 2221 may be spaced apart from each other at an area that substantially corresponds to the bushing mount 123. For example, a body 2222 of the auxiliary end plate 2221 may be in contact with each of the end plate 2211 and the battery cell 110, but the swelling absorption part 2224 of the auxiliary end plate 2221 may be only in contact with the battery cell 110 and may be spaced apart from the end plate 1211 and the bushing mount 123. Therefore, even when the bushing mount 123 is fixed to the pack mounting member, stress may not be concentrated in the battery cells 110 to suppress the deterioration of and reduce to damage to the battery cells 110. In addition, the lifespan of the battery cells 110 may increase because uniform pressure is applied to the battery cells 110 during the entire lifespan of the battery module 100.

Because the end plate 2211 and the auxiliary end plate 2221 (e.g., the swelling absorption part 2224) are in contact with each other in the EOL period, the rigidity of the entire end plate member 221 may be increased, and thus, the battery module 100 may not interfere with other components. In some embodiments, in the battery module 100 according to an embodiment, a swelling absorption space may be further provided between the end plate 2211 and the auxiliary end plate 2221 to reduce the cell swelling force. As the cell swelling force is reduced, the shear force on the coupling area (e.g., the welding area) between the end plate 2211 and the bushing mount 123 may be reduced, and/or the shear force on the coupling area (e.g., the welding area) between the side plate 122 and the bushing mount 123 may also be reduced.

In some embodiments, when the two protrusions 2215 provided on the end plate 2211 are coupled to the two concave grooves 2223 provided in the auxiliary end plate 2221, the end plate 2211 and the auxiliary end plate 2221, which are heterometals with respect to each other, may be coupled to each other. The rigidity of the end plate member 221 may be improved by the mutual coupling structure of the protrusion 2215 and the concave groove 2223. In some embodiments, the rigidity of the end plate 2211 may be less than that of the auxiliary end plate 2221, and thus, the end plate 2211 may deform in the EOL period. In embodiments of the present disclosure, however, the protrusion 2215 provided on the end plate 2211 may be more strongly fixed to the concave groove 2223 in the auxiliary end plate 2221 to suppress additional deformation of the end plate 2211.

In FIG. 5B, reference numeral 111 denotes the electrode assembly of the battery cell 110, reference numeral 112 denotes an insulating bag surrounding the electrode assembly 111, and reference numeral 113 denotes the cell can or the cell case.

Embodiments of the present disclosure may provide a battery module in which the lower area of the end plate and the lower area of the side plate are coupled to each other to reduce or minimize the swelling of the lower portion of the battery cell(s) when the battery pack is in the end-of-life (EOL) period, thereby preventing the lower portion of the battery cell(s) from being damaged and, also, to improve the assembly between the module and the pack interface when replacing or repairing the module that has reached EOL in a vehicle.

Embodiments of the present disclosure may also provide a battery module in which the battery cell(s) is/are not damaged or partially deteriorated even when the battery cell(s) exhibiting a high swelling force is applied to the module during the EOL period.

The above-described embodiments are merely some embodiments for carrying out the present disclosure, and the present disclosure is not limited to these embodiments. The technical spirit of the present disclosure includes all ranges of technologies that may be variously modified by an ordinary person in the art, to which the present disclosure pertains, without departing from the essence of the present disclosure as claimed in the following claims and their equivalents.

What is claimed is:

1. A battery module comprising:
   a battery cell having a top surface, a bottom surface opposite to the top surface, a long side surface extending between the top surface and the bottom surface, and a short side surface extending between the top surface, the bottom surface, and the long side surface, the battery cell comprising a terminal on the top surface;
   an end plate having an end area in contact with the long side surface of the battery cell and an end flange bent from a lower end of the end area in a direction away from the long side surface; and
   a side plate having a side area in contact with the short side surface of the battery cell, a side flange bent from a lower end of the side area to cover the bottom surface of the battery cell, and a side binder extending from the side flange and welded to the end flange,
   wherein the side binder comprises:
      an extension part gradually expanded to extend from the side flange;

a bent part bent from the extension part in an upward direction away from the long side surface; and a coupling part extending from the bent part and coupled to the end flange.

2. The battery module of claim 1, wherein the coupling part of the side binder and the end flange of the end plate are welded to each other.

3. The battery module of claim 1, wherein the end flange of the end plate and the side binder of the side plate are spaced apart from a corner part at where the long side surface, the short side surface, and the bottom surface of the battery cell contact each other.

4. A battery module comprising:

a battery cell having a top surface, a bottom surface opposite to the top surface, a long side surface extending between the top surface and the bottom surface, and a short side surface extending between the top surface, the bottom surface, and the long side surface, the battery cell comprising a terminal on the top surface;

an end plate having an end area in contact with the long side surface of the battery cell and an end flange bent from a lower end of the end area in a direction away from the long side surface; and a side plate having a side area in contact with the short side surface of the battery cell, a side flange bent from a lower end of the side area to cover the bottom surface of the battery cell, and a side binder extending from the side flange and coupled to the end flange, wherein the side binder extends in an S shape or a Z shape from the side flange.

5. The battery module of claim 1, wherein an area of the bottom surface of the battery cell covered by the side binder is greater than an area of the bottom surface of the battery cell covered by the side flange.

6. The battery module of claim 1, further comprising:

a first auxiliary end plate between the long side surface of the battery cell and the end plate; and a bushing mount on the long side surface of the battery cell and to which the end plate and the side plate are coupled.

7. The battery module of claim 6, wherein the first auxiliary end plate has a concave groove, and the end plate has a protrusion coupled to the concave groove.

8. The battery module of claim 6, wherein the first auxiliary end plate comprises:

a body in contact with the long side surface of the battery cell and the end plate; and a swelling absorption part extending from the body, in contact with the long side surface of the battery cell, and spaced apart from the end plate.

9. The battery module of claim 8, wherein the swelling absorption part has a thickness that is less than that of the body.

10. The battery module of claim 6, wherein the end plate comprises stainless steel, and the first auxiliary end plate comprises aluminum.

11. The battery module of claim 6, further comprising a pack mounting member coupled to a bottom surface of the bushing mount, wherein the bottom surface of the bushing mount is at a position higher than the end flange and the side binder.

12. The battery module of claim 6, further comprising:

a second auxiliary end plate coupled to the bushing mount; and an insulating plate coupled to the second auxiliary end plate.

* * * * *